US009014690B2

(12) United States Patent
Lundborg et al.

(10) Patent No.: US 9,014,690 B2
(45) Date of Patent: Apr. 21, 2015

(54) MONITORING CELLULAR RADIO ACCESS NODE PERFORMANCE

(75) Inventors: Tomas Lundborg, Hässelby (SE); Lars Klockar, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 826 days.

(21) Appl. No.: 12/876,904

(22) Filed: Sep. 7, 2010

(65) Prior Publication Data

US 2012/0058759 A1    Mar. 8, 2012

(51) Int. Cl.
| | |
|---|---|
| *H04W 24/00* | (2009.01) |
| *H04W 24/08* | (2009.01) |
| *H04B 7/155* | (2006.01) |
| *H04W 36/00* | (2009.01) |
| *H04W 40/00* | (2009.01) |
| *H04M 1/00* | (2006.01) |
| *H04L 1/00* | (2006.01) |
| *H04B 7/26* | (2006.01) |
| *H04W 24/02* | (2009.01) |
| *H04W 84/04* | (2009.01) |

(52) U.S. Cl.
CPC .............. *H04W 24/08* (2013.01); *H04B 7/155* (2013.01); *H04B 7/2606* (2013.01); *H04W 24/02* (2013.01); *H04W 84/047* (2013.01); *Y02B 60/50* (2013.01)

(58) Field of Classification Search
USPC ................ 455/7, 9, 404.1, 424, 423; 370/315
See application file for complete search history.

(56) References Cited

U.S. PATENT DOCUMENTS

| | | | | |
|---|---|---|---|---|
| 7,876,704 | B1* | 1/2011 | Bims et al. ..................... | 370/254 |
| 2001/0044279 | A1* | 11/2001 | Jeong ............................ | 455/67.7 |
| 2002/0049058 | A1* | 4/2002 | Tee ................................ | 455/437 |
| 2003/0013410 | A1* | 1/2003 | Park .............................. | 455/11.1 |
| 2003/0224777 | A1* | 12/2003 | Sakuma ........................ | 455/423 |
| 2005/0037763 | A1* | 2/2005 | Hamamoto et al. .......... | 455/447 |

(Continued)

FOREIGN PATENT DOCUMENTS

| | | |
|---|---|---|
| EP | 1 763 153 | 3/2007 |
| WO | WO 2006/102505 | 9/2006 |

OTHER PUBLICATIONS

Transmittal of International Search Report and Written Opinion of the International Searching Authority, Aug. 11, 2011, in PCT/IB2011/051760.

(Continued)

*Primary Examiner* — Timothy Pham

(57) ABSTRACT

The technology in this application reduces the maintenance effort and expense to monitor the performance of a cellular radio access node (e.g., a relay or repeater) by having the cellular radio access node automatically perform radio performance monitoring on itself and providing some kind of indication of its status to an operations and maintenance node. The cellular radio access node monitors performance of a set of one or more radio characteristics of a received radio signal received by the cellular radio access node or a transmitted radio signal transmitted by the cellular radio access node and determines whether the performance exceeds an associated predetermined threshold. The cellular radio access node indicates a condition of the cellular radio access node for the operations and maintenance node based on the monitored performance. The cellular radio access node may take independent action, e.g., shutdown, restart, reduce transmit power, etc., if a monitored condition is exceeded, e.g., transmitted noise exceeds a threshold.

29 Claims, 5 Drawing Sheets

(56) References Cited

U.S. PATENT DOCUMENTS

| | | |
|---|---|---|
| 2006/0217115 A1* | 9/2006 | Cassett et al. .................. 455/423 |
| 2007/0139183 A1* | 6/2007 | Kates ............................ 340/521 |
| 2008/0102897 A1* | 5/2008 | Song et al. .................. 455/562.1 |
| 2008/0305835 A1* | 12/2008 | Johnstone et al. ............ 455/561 |
| 2009/0190634 A1* | 7/2009 | Bauch et al. .................. 375/211 |
| 2010/0002582 A1* | 1/2010 | Luft et al. ................... 370/230.1 |
| 2010/0020701 A1* | 1/2010 | Arpee et al. .................. 370/252 |
| 2010/0027431 A1* | 2/2010 | Morrison et al. ............. 370/252 |
| 2012/0026865 A1* | 2/2012 | Fan et al. ...................... 370/225 |

OTHER PUBLICATIONS

Maintenance Watchdog™, Wireless Condition Monitoring System, 2000-2005.

ARIB STD-T63-25.467 V8.0.0, UTRAN Architecture for 3G Home, Release 8 (Dec. 2008), pp. 1-22.

Local Access, RS-4212/485 Repeater RD-48, www.westermo.us, (Retrieved from Internet approximately Jun. 2010).

* cited by examiner

MONITORING CELLULAR RADIO ACCESS NODE PERFORMANCE

TECHNICAL FIELD

The technical field relates to radio communications, and more particularly, to the radio performance of cellular radio access nodes like radio repeaters, relays, and base stations.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of a radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Universal Terrestrial Radio Access Network (E-UTRAN) are ongoing within the $3^{rd}$ Generation Partnership Project (3GPP). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Serving Gateways, or SGWs) rather than to radio network controller (RNC) nodes. In general, in LTE the functions of a radio network controller (RNC) node are distributed between the radio base stations nodes (eNodeB's in LTE) and SGWs. As such, the radio access network (RAN) of an LTE system has an essentially "flat" architecture comprising radio base station nodes without reporting to radio network controller (RNC) nodes.

Changes in a wireless environment affect the quality of signal transmitted and received. Reception power rapidly decreases in proportion to increasing distance between wireless communication entities. As a result, a wireless communication system may employ a relay or repeater station (RS), a micro/pico base station, or a femto or home base station to expand coverage and/or improve throughput, quality, etc.

A repeater station is typically less sophisticated, expensive, and intelligent than a regular base station (BS), NodeB, eNodeB, or access point (AP). A relay station may perform the same functions as a base station except that a relay does not connect to the backhaul network with a cable or microwave link and instead uses a nearby macro base station to connect to the backhaul network. Both a repeater and a relay perform an "amplify and forward" (AF) function where it amplifies a signal received from a BS/AP or a MS/UE and delivers the amplified signal to the MS/UE or the BS/AP. Some relays may perform a decoding and forward (DF) function as well as a scheduling function where communicated information is restored by performing demodulation and decoding on a signal received from the BS/AP or the MS/UE and generating the restored signal by performing coding and modulation which is then sent to the MS/UE or the BS/AP. Any cellular radio access node that performs this "amplify and forward" (AF) function where it amplifies a signal received from a cellular radio network or a MS/UE and delivers the amplified signal to the MS/UE or the cellular radio network is encompassed by the term "cellular radio access node." This includes relays, repeaters, traditional base stations and access points along with femto or home base stations that are not directly coupled to the radio access/backhaul network but instead communicate with the radio access/backhaul network via at least one other base station.

The cellular radio access node transmits or receives data using radio resources including one or more of a time resource, a frequency resource, a spatial resource, etc. The time resource may be expressed by a subframe, a symbol, a slot, etc. The frequency resource may be expressed by a subcarrier, a resource block, a component carrier, etc. The spatial resource may be expressed by spatial multiplexing, an antenna, etc. Such radio resources may be used in a dedicated or shared manner.

Certain cellular radio access nodes like repeaters and relays are not equipped to communicate directly with an operation and maintenance node for the communications system, and thus, do not send fault/ alarm data or performance monitoring data directly to operation and maintenance node. As a result, operation and maintenance of certain cellular radio access nodes like repeaters and relays is typically performed by technicians visiting the node site. This is expensive and time consuming. With increasing use of smaller nodes like relays and repeaters in communications networks deployed on a relatively large scale, the cost and time for such site visits also increases. Even where a malfunction is detected, it is not always apparent which relay or repeater is malfunctioning if there are multiple relays or repeaters operating in the same area.

Another problem is that between site visits, which may well be infrequent or in the case of relay, repeater, and small base station nodes rarely or non-existent, the network operator may not be made aware either in a timely fashion or ever of that such a node has malfunctioned or is operating below a certain performance level. As a result, it can take a long time before the operator discovers that the reason for a poor "dropped call rate" in an area is due to high noise level in a relay, repeater, or small base station.

SUMMARY

The technology in this application reduces the maintenance effort and expense to monitor the performance of a cellular radio access node (e.g., a relay, repeater, or base station) by having the cellular radio access node automatically conduct radio performance monitoring on itself and provide some kind of indication of its status to an operations and maintenance node. A main function of the cellular radio access node is to provide and/or facilitate communications between a communications network and mobile radio terminals. But, in addition, the cellular radio access node monitors performance of a set of one or more radio characteristics associated with the cellular radio access node and determines whether the performance exceeds an associated predetermined threshold. For example, the performance of a received radio signal received by the cellular radio access node or a transmitted radio signal transmitted by the cellular radio access node may be monitored. The cellular radio access node indicates a condition of the cellular radio access node for the operations and maintenance node based on the monitored performance. In addition, the cellular radio access node may take independent action, e.g., shutdown, restart, reduce transmit power, etc., if a monitored condition is exceeded, e.g., transmitted noise exceeds a threshold.

In one non-limiting application, the cellular radio access node is a relay node or repeater node. The facilitating communications in this application includes receiving a downlink radio signal from a base station intended for a mobile terminal, amplifying the downlink radio signal, and transmitting the amplified downlink radio signal to the mobile terminal, and receiving an uplink radio signal from the mobile terminal, amplifying the uplink radio signal, and transmitting the amplified uplink radio signal to the base station. In another non-limiting application, the cellular radio access node is a macro, micro, pico, or femto base station.

The indication may include sending a signal to an operations and maintenance node if the monitored performance is satisfactory, e.g., according to some predetermined protocol. The cellular communications node may send the indication to the operations and maintenance node over a radio or a wire connection.

One non-limiting example way for the cellular radio access node to send the signal is use a communications module used in a mobile terminal. Specifically, the communications module is used to establish a radio connection with the operations and maintenance node and to send the signal to the operations and maintenance node via the radio connection. Although any format may used, the signal may be sent for example using the internet protocol (IP) or as a short message service (SMS) message. The communications module, in one example implementation, may share radio resources allocated to the cellular radio access node, and a controller in the node may control access by the communications module to those shared radio resources.

The monitored performance is, for example, of a set of one or more radio characteristics of a received radio signal or a transmitted signal at the cellular radio access node. If the monitored performance is not satisfactory, then the indicating includes, in one non-limiting example embodiment, not sending the signal to the operations and maintenance node. The absence of the expected signal is detected by the operations and maintenance node. One example way to monitor performance is for the cellular radio access node to compare the set of one or more radio characteristics to a set of one or more corresponding thresholds. If the threshold is not exceeded, then a feedback signal is transmitted to the operations and maintenance node signifying satisfactory node performance. If the threshold is exceeded, then the feedback signal is not transmitted to the operations and maintenance node or a non-satisfactory node performance signal may be sent to the operations and maintenance node. Alternatively, if the threshold is exceeded, then an action may be initiated to improve the performance or otherwise change the operation of the cellular radio access node.

In one example variation, the indicating includes sending a message to the operations and maintenance node including monitored performance data regarding the cellular radio access node. Further, an instruction from the operations and maintenance node may be received, and a task performed by the cellular radio access node based on the received instruction. The task can relate for example to any of the following: reducing transmit power for a signal transmitted by the cellular radio access node, resetting the cellular radio access node, shutting down operation of some part or all of the cellular radio access node.

The set of one or more radio characteristics associated with the cellular radio access node may include one or more of the following: outband interference caused by a transmission of the received downlink or uplink radio signal or the transmitted downlink or uplink signal node, received interference at the cellular radio access node, poor receiver performance at the cellular radio access node, output power associated with a transmission of the relay node, signal distortion caused by the relay node, or a signal to noise ratio associated with a transmission of the cellular radio access node. If desired, the first set of one or more radio characteristics associated with the cellular radio access node may be modified.

It is also possible to monitor performance of a second set of one or more conditions associated with hardware components of the cellular radio access node. When the performance of one or more conditions associated with hardware components of the cellular radio access node exceeds an associated predetermined threshold, then a message is sent to an operations and maintenance node based on the monitored performance.

DETAILED DESCRIPTION

Figure 1:
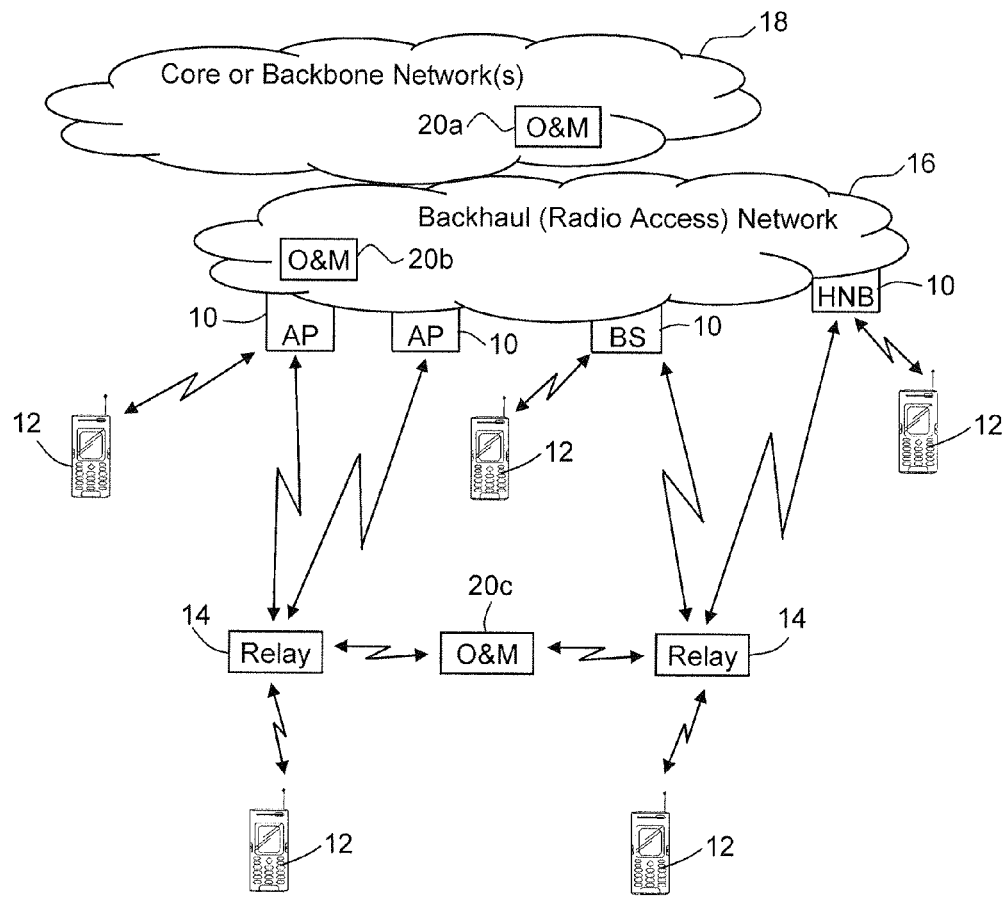
FIG. 1 illustrates a non-limiting example wireless communications system.

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The technology may be used in any type of cellular radio communications. For ease of description, the term "radio terminal" encompasses any kind of radio communications terminal/device like user equipment (UE), mobile station (MS), PDAs, cell phones, laptops, etc. The technology described in this application may be used in any cellular radio communications system. One non-limiting example is a WCDMA network which communicates with one or more user equipments (UEs) over a Uu air interface. Typically, one or more core networks communicate with radio network controllers (RNCs) in the WCDMA network over an Iu interface. A WCDMA radio access network (RAN) may also be called Universal Mobile Telecommunications System (UMTS) Terrestrial Radio Access Network (UTRAN). The WCDMA RAN handles all tasks that relate to radio access control such as radio resource management and handover control. The core network connects the access network to one or more external networks (PSTN, Internet, etc.). The user equipment is connected to one or more radio base stations (Node Bs) over the WCDMA air interface. One or more base stations are coupled to an RNC over an Iub interface, and RNCs communicate over an Iur interface. The term "base station" is used to encompass any radio node that directly communicates with a radio access or backhaul network, e.g, a NodeB, eNodeB, an access point, a femto base station, or a home base station, etc.

FIG. 1 illustrates a non-limiting example cellular communications system that uses relay, repeater, access point, and base station nodes. One or more base stations 10 including access points (APs), base stations (BSs) like NodeBs and eNBs, and home base stations 10 are connected to an access network or backhaul network 16. The access network or backhaul network 16 is coupled to one or more core or backbone network(s) 18. The base stations 10 communicate directly with radio terminals 12 over a radio interface. Some of the base stations 10 also communicate directly with relay/repeater nodes 14 over a radio interface and the relay/repeater node 14 relays signals it receives from the base station 10 to one or more radio terminals 12. The inventors conceived of technology that allows a base station 10 and/or a relay/repeater 14 to independently and automatically monitor and communicate radio quality performance of that relay/repeater node 14 to an operations and maintenance node (O&M) 20 and in some example embodiments to receive instructions from the O&M 20 related to monitoring and performance. As shown in FIG. 1, the O&M 20 may be located in the core or backbone network (20a), in the backhaul or radio access network (20b), as a stand-alone node (20c), or in some other suitable location which may include a base station.

Figure 2:
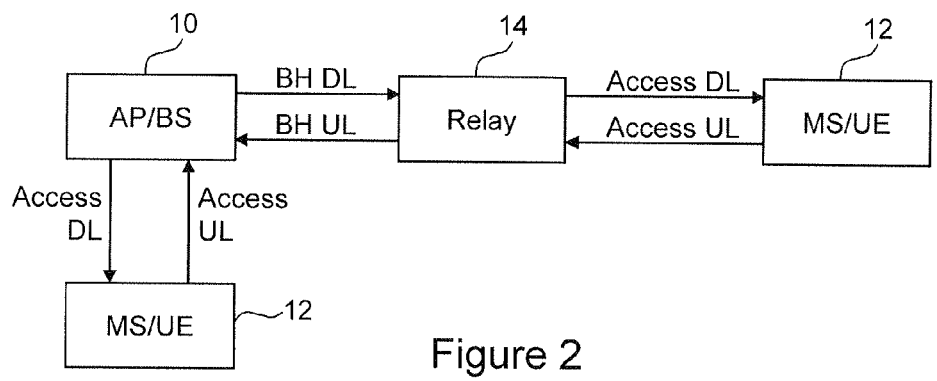
FIG. 2 illustrates communication paths or links between base station, mobile terminal, and relay/repeater node.

FIG. 2 illustrates communication paths or links between base station, radio terminal, and relay node. While a base station has a direct connection with an access network or backhaul network, a relay/repeater node must access the access network or backhaul network via a base station. As shown in FIG. 2, a relay/repeater node 14 receives a backhaul (BH) downlink (DL) radio signal from a base station 10 intended for a mobile terminal, amplifies the downlink radio signal using one or more power amplifiers, and transmits the amplified access downlink radio signal to the radio terminal 12. In the uplink direction, the relay/repeater node 14 receives access uplink radio signal from the radio terminal 12, amplifies the uplink radio signal using one or more power amplifiers, and transmits the amplified backhaul uplink radio signal to the base station 10. FIG. 2 also shows that the base station 10 may communicate directly with a radio terminal 12 over an access downlink, and the radio terminal 12 may communicate directly with the base station 10 over an access uplink.

The technology in this application may be used in any "cellular radio access node" that is part of a radio access network including any type of base station, relay, or repeater that performs an amplify and forward function and, as described in the background, does not monitor and report its own radio performance. For purposes of illustration, the following description uses a relay/repeater node as a non-limiting example "cellular radio access node."

Figure 3:
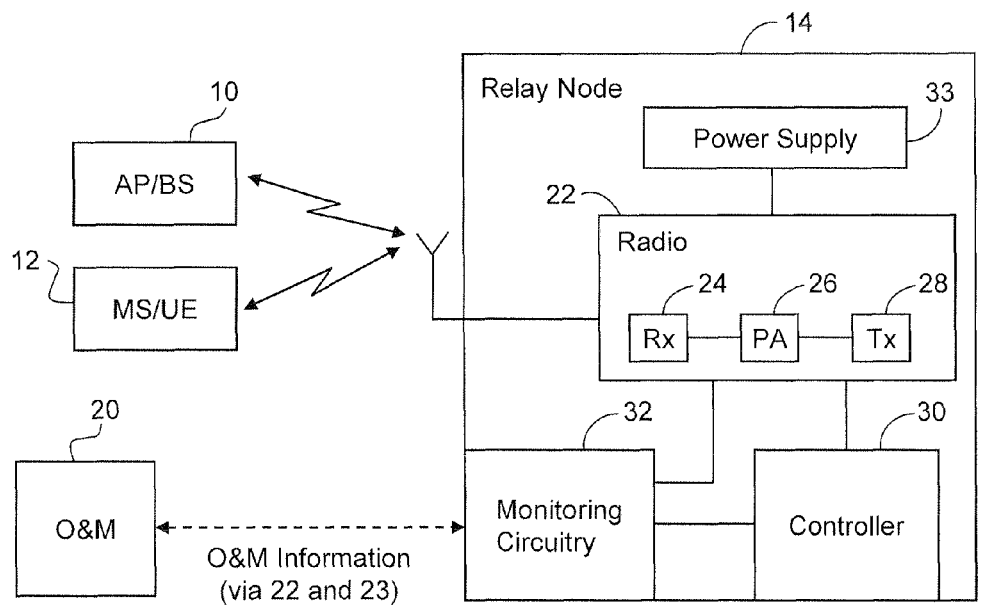
FIG. 3 is a non-limiting example function block diagram illustrating a relay/repeater node with performance monitoring and reporting.

FIG. 3 is a non-limiting example function block diagram illustrating an example relay/repeater node 14 with performance monitoring and reporting. The relay/repeater node 14 includes radio circuitry 22 including one or more radio receivers (Rx), one or more power amplifiers (PA), and one or more radio transmitters (Tx) that perform typical relaying or repeating of radio signals between the network and radio terminals. A relay node, as opposed to a repeater, also contains circuitry (not shown) for decoding a received signal and encoding it before retransmission. The radio circuitry 22 is connected to one or more antennas for communicating radio signals over a radio interface with one or more base stations 10 and one or more radio terminals 12. The relay/repeater node 14 also includes monitoring circuitry 32 for monitoring the radio performance of the relay/repeater node 14. The monitoring circuitry 32 monitors one or more radio performance parameters of the relay/repeater node 14, including one or more radio signal characteristics of a received radio signal received by the cellular radio access node or a transmitted radio signal transmitted by the cellular radio access node, and determines whether the performance exceeds an associated predetermined threshold. The monitoring circuitry 32 indicates a condition of the cellular radio access node for the operations and maintenance node based on the monitored performance. A power supply 33 provides power for operation of the components of the node 14.

In one non-limiting example embodiment, the indication may include sending a signal to an operations and maintenance node if the monitored performance is satisfactory, e.g., a simple "tick," pulse, message, etc. The cellular communications node may send the indication to the operations and maintenance node over a radio or a wire connection. The dotted line is used in FIG. 3 to indicate a logical connection with the O&M node 20. The connection is preferably a radio connection, in which case the actual communications path would be by way of the antenna and radio 22. But the connection may also be a wire connection indicated as 23. If the monitored performance is not satisfactory, no indication is sent. The operations and maintenance node may detect the absence of an expected indication signal, and if desired (though not necessary), take some responsive action, e.g., request specific information from the relay/repeater node.

Figure 4:
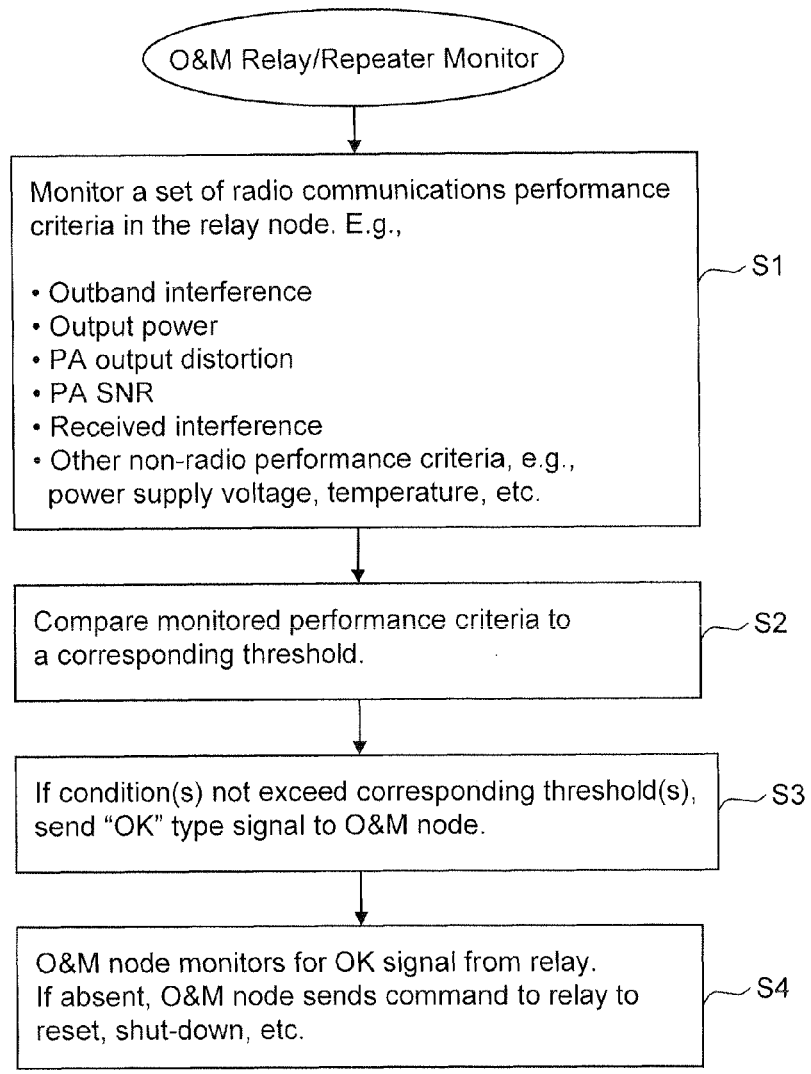
FIG. 4 illustrates an example flowchart entitled O&M relay monitor in accordance with a first non-limiting example embodiment.

FIG. 4 illustrates a non-limiting example flowchart entitled relay/repeater monitor in accordance with a first non-limiting example embodiment. The monitored performance in step S1 is, for example, of one or more radio characteristics of the cellular radio access node. The set of one or more radio characteristics of the node, e.g., related to a received downlink or uplink radio signal or a transmitted downlink or uplink signal. The set of one or more radio characteristics of the node may include one or more of the following examples: outband interference caused by a transmission of the relay/repeater node, received interference, poor receiver performance, output power associated with a transmission of the relay/repeater node, signal distortion caused by the relay/repeater node, or a signal-to-noise ratio associated with a transmission of the relay/repeater node. If desired, the set of one or more radio characteristics may be modified.

One example way to monitor performance is to compare the set of one or more radio characteristics for the cellular radio access node (e.g., a relay/repeater) to a set of one or more corresponding thresholds (step S2). If the threshold(s) is (are) not exceeded, then a feedback signal (e.g., a simple tick, pulse, bit, or low bandwidth message, etc.) is transmitted to the operations and maintenance node 20 signifying satisfactory relay/repeater performance (step S3). The frequency with which the feedback signal is sent may be configured as desired, but will likely involve taking into account the bandwidth and processing resources allocated for such feedback from multiple cellular radio access nodes. But if a threshold is exceeded, then the feedback signal is not transmitted to the operations and maintenance node (step S4). Alternatively, a non-satisfactory relay/repeater performance signal may be sent to the operations and maintenance node 20. The O&M node 20 monitors for the feedback signal according to a predetermined protocol, and if the feedback signal is not received in accordance with that protocol, then the O&M node 20 may send a command to the node 14 to reset, shutdown, modify the transmission and/or reception in some way, etc. (step S4). Alternatively, a non-satisfactory relay/repeater performance signal may be sent to the operations and maintenance node 20.

Figure 5:
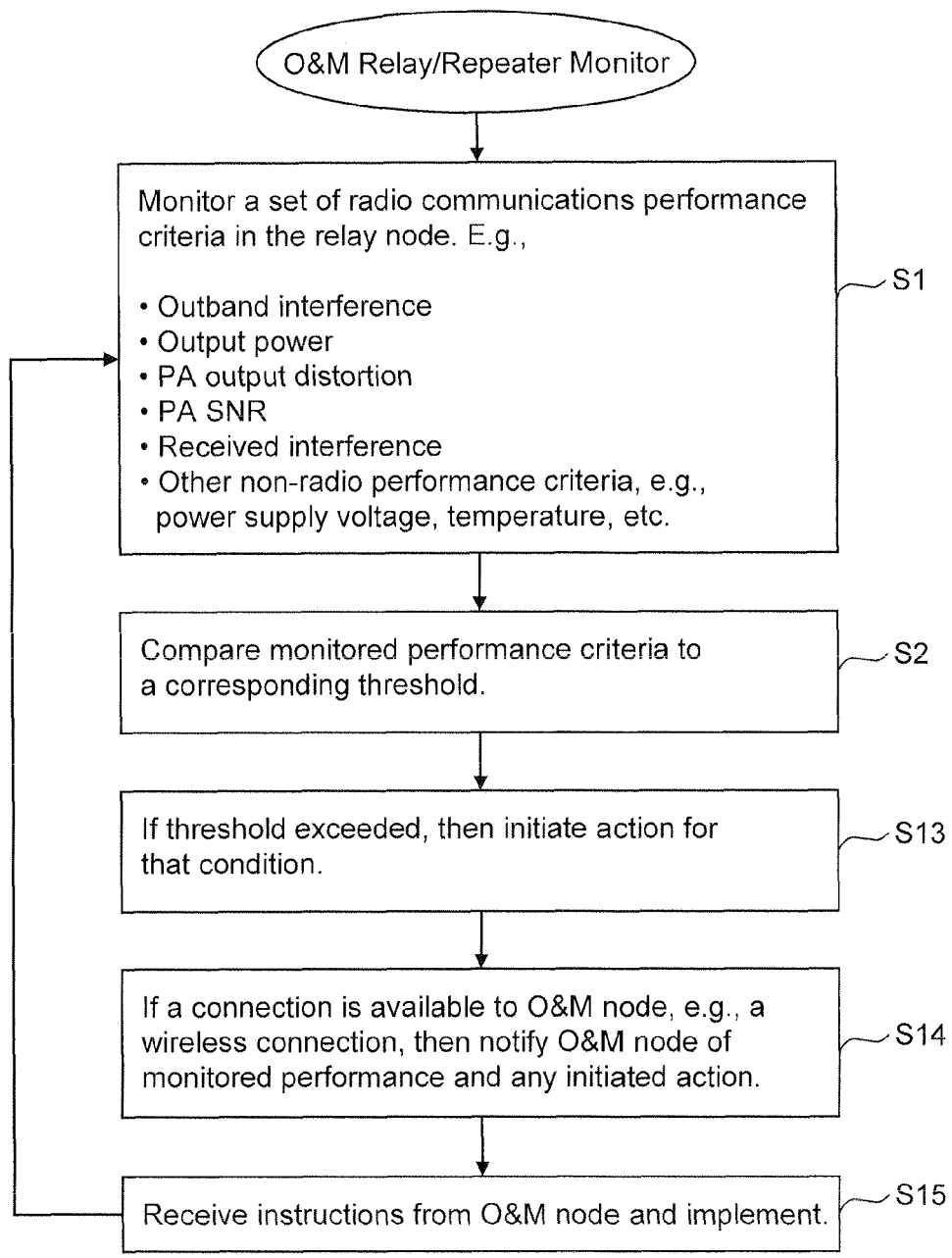
FIG. 5 illustrates a non-limiting example flowchart entitled O&M relay monitor in accordance with a second non-limiting example embodiment.

FIG. 5 illustrates a non-limiting example flowchart entitled O&M relay/repeater monitor in accordance with a second example embodiment (steps S1 and S2 are the same as in FIG. 4) in which a more involved monitoring operation may be performed at the relay/repeater node 14. For example, if a threshold is exceeded, the node 14 may initiate some action (step S13), e.g., reducing transmit power for a signal transmitted by the relay/repeater node, resetting the relay/repeater node, shutting down operation of some part or all of the relay/repeater node. In one example variation, the feedback signal may include a more detailed message to the operations and maintenance node 20 including monitored performance data regarding the cellular radio access node (step S14). Although any signal format may used, the feedback signal and/or optional detailed report may be sent for example using the internet protocol (IP) or as a short message service (SMS) message. As an example alternative to step S13 where the node 14 initiates some sort of responsive action, an instruction from the operations and maintenance node 20 may be received in response to the feedback signal or performance report (step S15), and a task is performed by the node 14 based on the received instruction. Again, the task can relate for example to any of the following: reducing transmit power for a signal transmitted by the relay/repeater node, resetting the relay/repeater node, shutting down operation of some part or all of the relay/repeater node.

It is also possible to monitor performance of a second set of one or more conditions associated with hardware components of the relay node, e.g., temperature, voltage, current, vibration, etc. When the performance of one or more conditions associated with hardware components of the relay/repeater node exceeds an associated predetermined threshold, then the node 14 may take some action (e.g., reducing transmit power for a signal transmitted by the relay/repeater node, resetting the relay/repeater node, shutting down operation of some part or all of the relay/repeater node), or a message may be sent to an operations and maintenance node based on the exceeded threshold.

Figure 6:
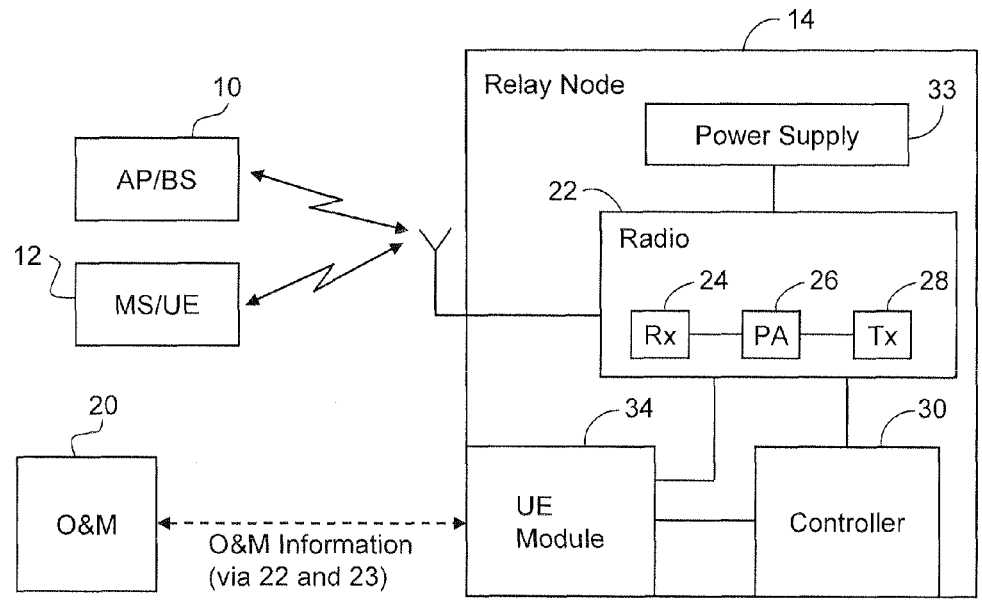
FIG. 6 a non-limiting example function block diagram illustrating a relay/repeater node with performance monitoring and reporting.

FIG. 6 a non-limiting example function block diagram illustrating a relay/repeater node 14 with performance monitoring and reporting. One non-limiting example way for the relay/repeater radio node 14 to send the signal is use a communications module 34 like that used in a typical mobile terminal 12. Although other communications circuitry may be used, a mobile terminal communications module is a particularly convenient option since many are already in mass production and configured with software to enable radio communications via radio circuitry in a cellular communications network. The radio terminal communications module 34 is used to establish a radio connection with the operations and maintenance node 20 and to send the signal to the operations and maintenance node via the radio connection. The communications module 34, in one example implementation, shares radio resources allocated to the cellular radio access node with the radio 22, and the controller 30 controls access by the communications module 34 to those shared radio resources, e.g., the communications module 34 transmits (and if desired receives) during time intervals when the relay/repeater node is not transmitting (and receiving).

Figure 7:
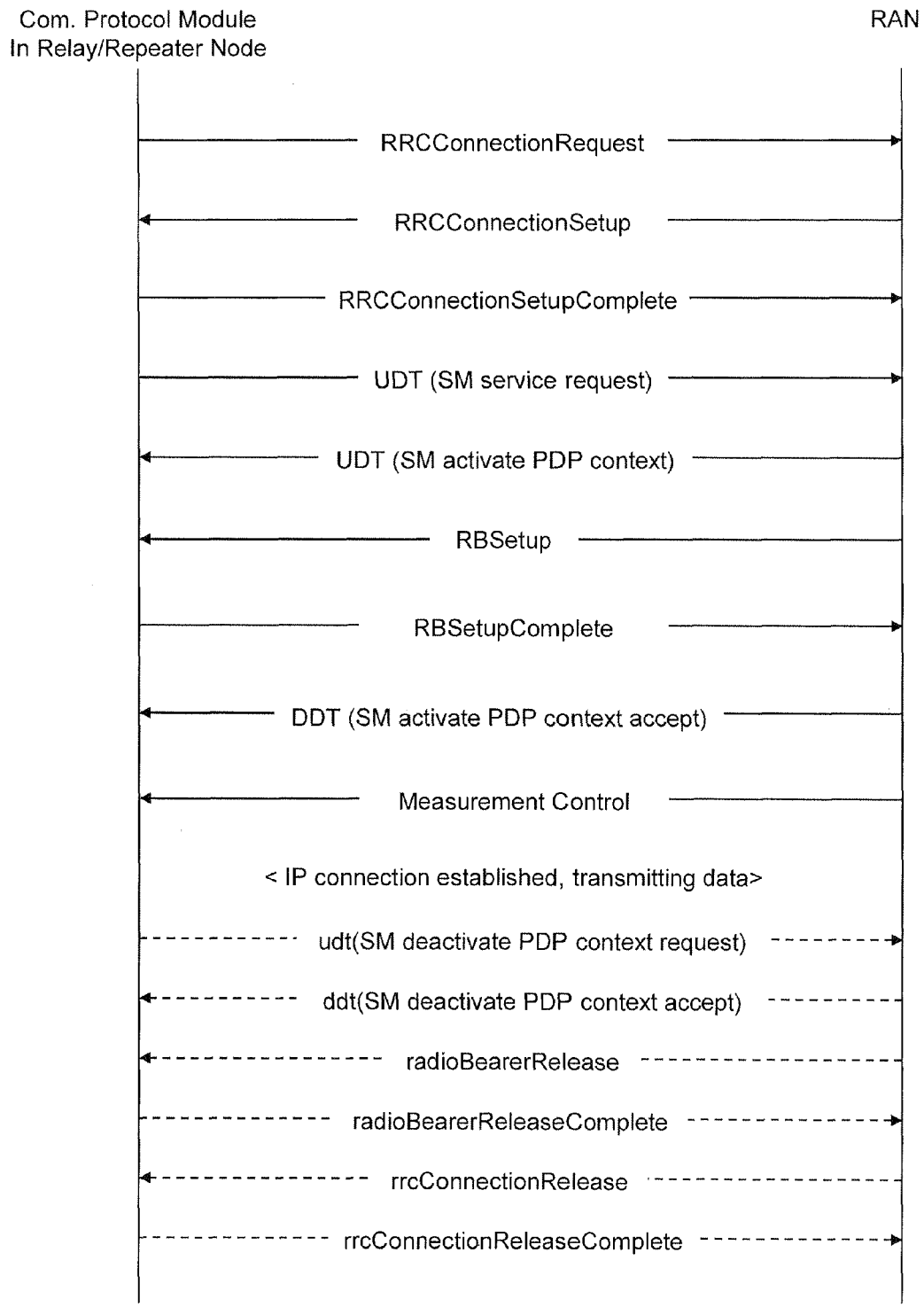
FIG. 7 is a non-limiting signaling diagram showing one example of signaling between the cellular radio access node to the operations and maintenance node.

FIG. 7 is a non-limiting signaling diagram showing one example of signaling from the cellular radio access node to the operations and maintenance node in a WCMDA type cellular system. This diagram is just for illustration of an example. The signals are radio resource control (RRC) messages. The relay/repeater node 14 (similar to a UE in WCDMA) initiates a connection with the radio access network using an RRC connection request message. The network responds by sending a connection setup message that is acknowledged when complete by the relay/repeater node 14. The relay/repeater node 14 then sends an uplink direct transfer (udt) short messaging (SM) service request to the network and an uplink direct transfer (udt) short messaging (SM) activate PDP context message to the network. The network responds with a radio bearer setup message acknowledged by the relay/repeater node 14 and follows with a downlink short messaging (SM) activate PDP context accept message. The measurement control signal is sent by the system for configuration of measurements in the relay/repeater node 14. One example includes neighbor cell measurements for handover. In the case of some traffic recording functions, UE-based measurements may also configured using this measurement control signal. The O&M node is connected to an IP network as 16 shown in FIG. 1 which connects to the system side of the signaling flow. This establishes an IP connection between the relay/repeater node 14 and the O&M node over which performance monitoring indication signals, messages, instructions, etc. may be sent. The IP connection may be taken down using the signaling commands shown in the remainder of the figure.

The technology permits cellular radio access nodes like relays, repeaters, and base stations that are not equipped to communicate directly with an operation and maintenance node for the communications system to do just that as well as to monitor their own performance and automatically communicate that performance to operation and maintenance node. As a result, operation and maintenance of such cellular radio access nodes need not be performed by technicians visiting the node site eliminating significant expense and time. Another benefit is that malfunctions are detected in a particular cellular radio access node and communicated in some fashion in a timely way to an operation and maintenance node rather than having to wait for a technician visit. Indeed, a technician visit may not even be scheduled because there may be not any indication to the network operator that a particular cellular radio access node is not functioning in a satisfactory manner.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for a cellular radio access node in a cellular communications system, the method comprising:

the cellular radio access node facilitating communications between a radio access network and mobile radio terminals by receiving a downlink radio signal from a base station intended for a mobile terminal, amplifying the downlink radio signal or decoding the downlink radio signal, and transmitting the amplified or decoded downlink radio signal to the mobile terminal, and receiving an uplink radio signal from the mobile terminal, amplifying or decoding the uplink radio signal, and transmitting the amplified or decoded uplink radio signal to the base station;

the cellular radio access node monitoring performance of a first set of one or more radio characteristics of a radio signal received by the cellular radio access node or a radio signal transmitted by the cellular radio access node;

the cellular radio access node determining whether the monitored performance exceeds an associated predetermined threshold; and the cellular radio access node indicating a condition of the cellular radio access node for an operations and maintenance node based on the monitored performance, the indication being whether the monitored performance is satisfactory or not, wherein the operations and maintenance node (1) is separate from the base station, (2) does not process the downlink radio signal or the uplink radio signal to enable the communications between the radio access network and the mobile radio terminals, and (3) performs operations and maintenance functions associated with multiple cellular radio access nodes and multiple base stations in the cellular communications system;

the method further comprising the cellular radio access node initiating an action to improve the performance when the predetermined threshold is exceeded; and the cellular radio access node initiating an action independent from the operations and maintenance node when the predetermined threshold is exceeded, wherein the action includes one of the following: restarting the cellular radio access node, shutting down the cellular radio access node, or reducing an output power of the cellular radio access node.

2. The method in claim 1, wherein the cellular radio access node is a relay node or repeater node, and wherein the monitored performance is of the first set of one or more radio signal characteristics of a received radio signal or a transmitted signal.

3. The method in claim 1, wherein the indicating includes the cellular radio access node sending a signal to the operations and maintenance node if the monitored performance is satisfactory.

4. The method in claim 3, wherein the sending the signal includes the cellular radio access node establishing a radio connection with the operations and maintenance node, and sending the signal to the operations and maintenance node via the radio connection.

5. The method in claim 4, wherein the radio connection with the operations and maintenance node is established through the base station.

6. The method in claim 1, wherein the indicating includes the cellular radio access node not sending a signal to the operations and maintenance node if the monitored performance is not satisfactory.

7. The method 1, wherein the indicating includes the cellular radio access node sending a message to the operations and maintenance node including monitored performance data regarding the cellular radio access node.

8. The method in claim 1, further comprising:
the cellular radio access node transmitting a feedback signal to the operations and maintenance node signifying satisfactory cellular radio access node performance when the predetermined threshold is not exceeded; and
the cellular radio access node not transmitting the feedback signal to the operations and maintenance node or sending a non-satisfactory cellular radio access node performance signal to the operations and maintenance node when the predetermined threshold is exceeded.

9. The method in claim 1, further comprising:
the cellular radio access node receiving an instruction from the operations and maintenance node; and
the cellular radio access node performing a task based on the received instruction.

10. The method in claim 9, wherein the task relates to any one or more of the following:
reducing transmit power for a signal transmitted by the cellular radio access node,
resetting the cellular radio access node, and
shutting down operation of some part or all of the cellular radio access node.

11. The method in claim 1, wherein the first set of one or more radio signal characteristics of the received downlink or uplink radio signal or the transmitted downlink or uplink signal includes one or more of the following:
outband interference caused by a transmission of the cellular radio access node,
received interference,
output power associated with a transmission of the cellular radio access node,
signal distortion caused by the cellular radio access node, and
a signal to noise ratio associated with a transmission of the cellular radio access node.

12. The method in claim 11, further comprising:
the cellular radio access node monitoring performance of a second set of one or more conditions associated with hardware components of the cellular radio access node;
the cellular radio access node determining when the performance of one or more conditions associated with hardware components of the cellular radio access node exceeds an associated predetermined threshold; and
the cellular radio access node sending a message to the operations and maintenance node based on the monitored performance.

13. The method in claim 1, wherein the indicating includes the cellular radio access node sending a signal to the operations and maintenance node and the cellular radio access node sends the indication to the operations and maintenance node over a wire connection.

14. The method in claim 13, wherein the signal is sent using an internet protocol (IP) and/or the signal is sent as a short message service (SMS) message.

15. The method in claim 1, wherein the indicating includes the cellular radio access node sending a signal to the operations and maintenance node and the cellular radio access node sends the indication to the operations and maintenance node over a radio connection.

16. The method in claim 1, further comprising:
the cellular radio access node modifying the first set of one or more radio characteristics.

17. An apparatus for a cellular radio access node facilitating communications mobile radio terminals, the apparatus comprising:
a radio circuitry configured to:
receive a downlink radio signal from a base station intended for a mobile terminal, amplify or decode the downlink radio signal, and transmit the amplified or decoded downlink radio signal to the mobile terminal, and
receive an uplink radio signal from the mobile terminal, amplify or decode the uplink radio signal, and transmit the amplified or decoded uplink radio signal to the base station;
a monitoring circuitry configured to monitor performance of a first set of one or more radio characteristics of a radio signal received by the cellular radio access node or a radio signal transmitted by the cellular radio access node;
a comparison circuitry configured to determine whether the monitored performance exceeds an associated predetermined threshold; and
an indication circuitry configured to indicate a condition of the cellular radio access node for an operations and maintenance node based on the monitored performance, the indication being whether the monitored performance is satisfactory or not,
wherein the operations and maintenance node
(1) is separate from the base station,
(2) does not process the downlink radio signal or the uplink radio signal to enable the communications between the radio access network and the mobile radio terminals, and
(3) performs operations and maintenance functions associated with multiple cellular radio access nodes and multiple base stations in the cellular communications system;
further comprising a circuitry configured to initiate an action to improve the performance when the predetermined threshold is exceeded; and
further comprising a circuitry configured to initiate an action independent from the operations and maintenance node if the predetermined threshold is exceeded,
wherein the action includes one of the following: restarting the cellular radio access node, shutting down the cellular radio access node, or reducing an output power of the cellular radio access node.

18. The apparatus in claim 17,
wherein the cellular radio access node is a relay node or repeater node, and
wherein the monitored performance is of the first set of one or more radio signal characteristics of a received radio signal or a transmitted signal.

19. The apparatus in claim 17, wherein the indication circuitry is configured to send a signal to an operations and maintenance node if the monitored performance is satisfactory.

20. The apparatus in claim 17, wherein the radio circuitry includes a communications module configured to establish a radio connection between the apparatus for the cellular radio access node and the operations and maintenance node and to send a signal to the operations and maintenance node via the radio connection.

21. The apparatus in claim 20, wherein the communication module is configured to establish the radio connection through the base station.

22. The apparatus in claim 17, wherein the indicating includes not sending a signal to the operations and maintenance node if the monitored performance is not satisfactory.

23. The apparatus in claim 17, wherein the indication circuitry is configured to send a message to the operations and maintenance node including monitored performance data regarding the cellular radio access node.

24. The apparatus in claim 17, further comprising a circuitry configured to:
- transmit a feedback signal to the operations and maintenance node signifying satisfactory cellular radio access node performance, if the predetermined threshold is not exceeded, and
- not transmit the feedback signal to the operations and maintenance node or sending a non-satisfactory cellular radio access node performance signal to the operations and maintenance node if the predetermined threshold is exceeded.

25. The apparatus in claim 17, further comprising a circuitry configured to:
- receive an instruction from the operations and maintenance node, and
- perform a task based on the received instruction,
- wherein the task relates to any of the following:
  - reducing transmit power for a signal transmitted by the cellular radio access node,
  - resetting the cellular radio access node, and
  - shutting down operation of some part or all of the cellular radio access node.

26. The apparatus in claim 17, wherein the first set of one or more radio signal characteristics of the received downlink or uplink radio signal or the transmitted downlink or uplink signal includes one or more of the following:
- outband interference caused by a transmission of the cellular radio access node,
- received interference,
- output power associated with a transmission of the cellular radio access node,
- signal distortion caused by the cellular radio access node, and
- a signal to noise ratio associated with a transmission of the cellular radio access node.

27. A method of operating a cellular radio access node in a cellular communications system, the cellular radio access node being a repeater or a relay, method comprising:
- facilitating, by the cellular radio access node, radio communications between a radio access network and mobile radio terminals, wherein the step of facilitating the radio communication comprises
  - receiving a downlink radio signal from a base station intended for a mobile terminal, and retransmitting the received downlink radio signal to the mobile terminal, and
  - receiving an uplink radio signal from the mobile terminal, and retransmitting the received uplink radio signal to the base station;
- monitoring, by the cellular radio access node, performance of one or more radio characteristics of a radio signal received by the cellular radio access node or a radio signal transmitted by the cellular radio access node;
- notifying, by the cellular radio access node, an operation and maintenance node an indication of a condition of the cellular radio access node based on the monitored performance,
- wherein the operations and maintenance node
  (1) is separate from the base station,
  (2) does not process the downlink radio signal or the uplink radio signal to enable the communications between the radio access network and the mobile radio terminals, and
  (3) performs operations and maintenance functions associated with multiple cellular radio access nodes and multiple base stations in the cellular communications system, and
- wherein the step of notifying the operation and maintenance node comprises:
  - establishing, by the cellular radio access node, a radio connection with the base station; and
  - notifying, by the cellular radio access node, the operation and maintenance node via the radio connection established with the base station
- the method further comprising determining, by the cellular radio access node, whether the monitored performance exceeds an associated predetermined threshold;
- the cellular radio access node initiating an action to improve the performance when the predetermined threshold is exceeded; and
- the cellular radio access node initiating an action independent from the operations and maintenance node when the predetermined threshold is exceeded,
- wherein the action includes one of the following: restarting the cellular radio access node, shutting down the cellular radio access node, or reducing an output power of the cellular radio access node.

28. The method of claim 27, wherein the step of establishing the radio connection with the base station comprises establishing the radio connection with the base station utilizing radio protocols that a mobile terminal would use to establish a radio connection with the base station.

29. The method of claim 27, further comprising:
- determining, by the cellular radio access node, whether the monitored performance exceeds an associated predetermined threshold,
- wherein the step of notifying the operation and maintenance node comprises notifying the operation and maintenance node comprises on whether or not the monitored performance is satisfactory based on whether or not the monitored performance exceeds the associated predetermined threshold.

* * * * *